United States Patent [19]

Skutecki

[11] 4,227,664

[45] Oct. 14, 1980

[54] STALL CURRENT LIMITER FOR SERVO DRIVE SYSTEMS

[75] Inventor: Edmund R. Skutecki, Glendale, Ariz.

[73] Assignee: Sperry Corporation, New York, N.Y.

[21] Appl. No.: 32,433

[22] Filed: Apr. 23, 1979

[51] Int. Cl.³ .............................................. G05D 1/00
[52] U.S. Cl. ................. 244/194; 244/17.13; 340/27 SS
[58] Field of Search ............... 244/17.13, 194, 181, 244/178, 83 R, 83 E, 83 G, 195, 197; 364/424; 340/27 SS, 27 R; 91/363 R, 363 A; 318/563, 565, 566, 588

[56] References Cited

U.S. PATENT DOCUMENTS

| | | | |
|---|---|---|---|
| 3,213,702 | 10/1965 | Deehan et al. | 74/424.8 R |
| 3,920,966 | 11/1975 | Knemeyer et al. | 244/17.13 X |
| 4,063,140 | 12/1977 | Kammerer et al. | 244/194 X |
| 4,082,238 | 4/1978 | Fabian et al. | 244/194 X |

Primary Examiner—Reinhard J. Eisenzopf
Attorney, Agent, or Firm—Howard P. Terry

[57] ABSTRACT

The invention provides improvements whereby the stall current of an actuator servo loop is limited without adversely affecting actuator speed or servo loop dynamics by supplying variable current limits. Full high current capacity is allowed in dynamic situations, but a desirably severe current limit is imposed in the event of a long term stall of the actuator. A simple and inexpensive modification of the servo loop permits the improvement with no limitation of the maximum slew rate and no adverse effects on the large and small amplitude frequency response.

7 Claims, 2 Drawing Figures

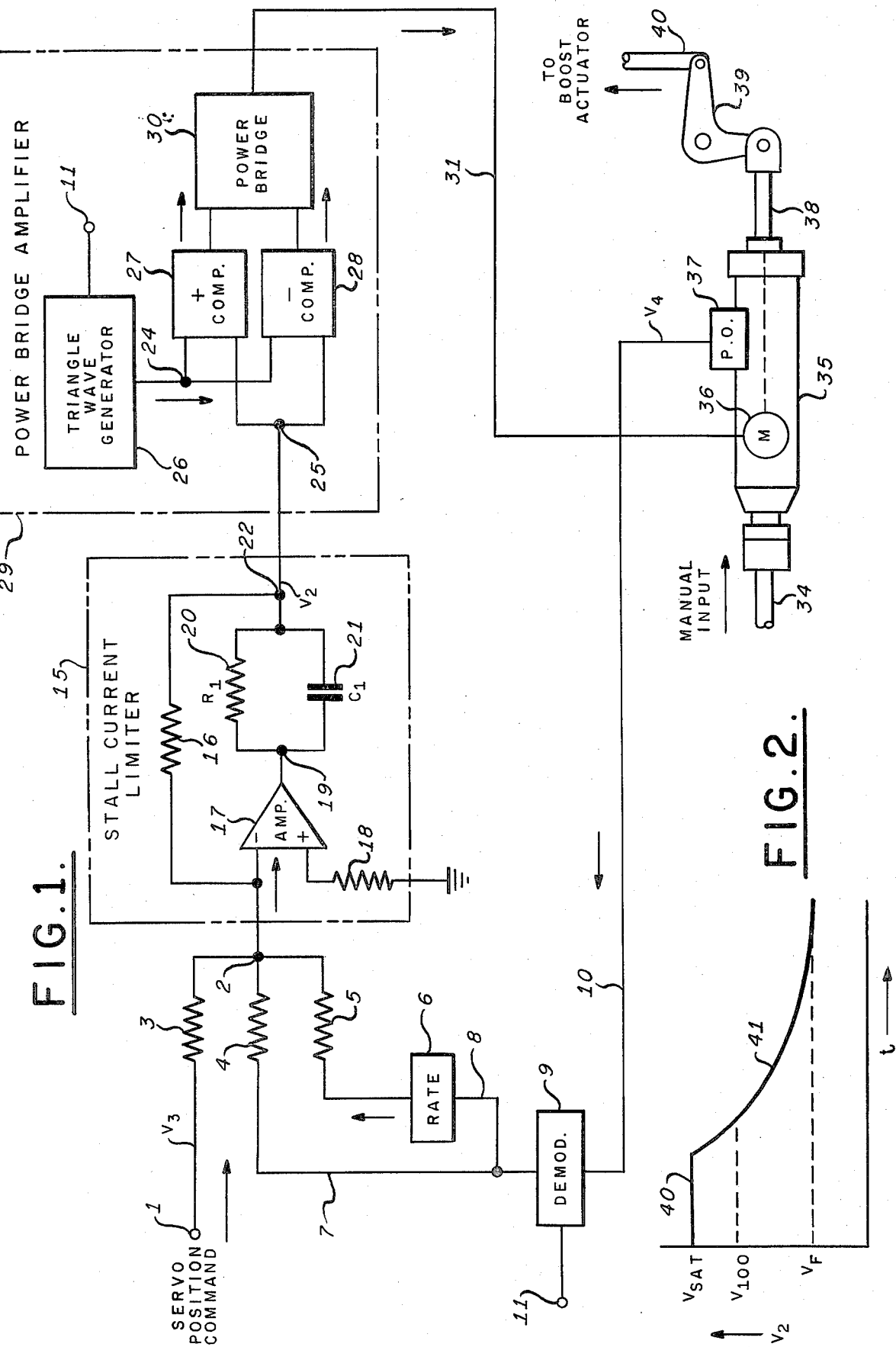

STALL CURRENT LIMITER FOR SERVO DRIVE SYSTEMS

BACKGROUND OF THE INVENTION

1. Field of the Invention

The present invention relates generally to the art of servomechanisms, more especially to servomechanisms enabling the automatic flight control of aircraft, and particularly to the provision of effective and reliable stall current limiting of servo motors driving aircraft control surfaces.

2. Description of the Prior Art

Servo systems of the past have, in many applications, been output torque-limited mechanically or electrically. Mechanical limiter systems have involved slip clutches, but these demonstrate wear, material fatigue, adhesion after long intervals of none-use, and undesired response to lubricants, particulate matter, and the like. Such deficiencies result in unpredictable responses over a wide range of input threshold values.

In electrical limiters for servomechanisms, it has been customary to place a finite resistor in series with the power supply driving the servo motor which resistor, in cooperation with the impedance of the servo motor itself, provides a limit on the maximum current that can be drawn by the servo motor. Experience with this type of series torque limiter has shown its several disadvantages, including variation in the torque limit caused by power supply variations, temperature variation, and changes in the servo motor impedance, and inefficiency caused by the attendant power loss in the series resistor.

In more recent servo systems, such as those of the Rauschelbach patent to be later discussed herein, control of the torque of an automatic pilot servo motor involves feeding the servo motor current driving the loaded surface back to the servo input through a current limiter to limit the maximum current that can be supplied to the motor. However, the patented system limits current and, hence, output torque for both high and low frequency components of the input command signal and is therefore found not to be desirable particularly where boosted control systems are needed, such as in helicopter flight control systems where a series actuator accepting both autopilot and manual commands is to operate into a high power boost surface actuator. Without current limiting, the series actuator may be forced hardover into a full stall for an extended time, possibly permanently damaging it by overheating. With the current limiting system of the prior art, actuator travel speed is undesirably reduced and the servo loop band width is degraded.

SUMMARY OF THE INVENTION

The invention provides improvements whereby the stall current of an actuator servo loop is limited without adversely affecting actuator speed or servo loop dynamics by supplying variable current limits. Full high current capacity is allowed in dynamic situations, but a desirably severe current limit is imposed in the event of a long term stall of the actuator. A simple an inexpensive modification of the servo loop permits the improvement with no limitation of the maximum slew rate and no adverse effects on the large and small amplitude frequency response.

BRIEF DESCRIPTION OF THE DRAWINGS

FIG. 1 is a drawing showing electrical and mechanical elements of the invention and their interconnections.

FIG. 2 is a graph useful in explaining the operation of the invention.

DESCRIPTION OF THE PREFERRED EMBODIMENTS

In FIG. 1, there is illustrated a closed loop servomechanism for positioning a craft control surface, in this embodiment, a series actuator system for positioning the swash plate of a helicopter, in accordance with a position command from a flight control computer. Other types of actuators may, of course, be employed. The servo position command signal $V_3$ is supplied to the terminal 1 of a servo input electrical combining network which combines control signals supplied in turn to the stall current limiter 15 of the present invention. After being processed by limiter 15, the servo error signal is used to actuate a power bridge amplifier 29 that serves to boost the power level of the error signal sufficiently to operate series actuator 35. Series actuator 35 may be of the type connected directly in to the surface control linkage so that it is operated also by manual input commands through shaft 34. It will in some applications be adapted so that output shaft 38 may directly drive the device or surface to be controlled or may, in others, be used to operate a more powerful boost actuator through linkage 39, 40 for the positioning of the aircraft control surface. Actuator 35 is generally conventional and includes an electrical positioning motor 36 and an output shaft 38 position pickoff or linear differential transducer 37 for supply of a surface position signal or, in the case of a series actuator, a differential surface position signal $V_4$. While various kinds of series actuators may be used, one such device may be that described in the L. W. Deehan, P. E. Jacobson U.S. Pat. No. 3,213,702, issued Oct. 26, 1965 for a "Jackscrew" and assigned to Sperry Rand Corporation. This device converts the reversible rotary motion of motor 36 into selectively bidirectional rectilinear expansion of the actuator along its shaft axis between shafts 34, 38 and is advantageous because it is relatively insensitive to changes in the loading condition along that axis.

Amplified error signals are supplied to actuator motor 36 via electrical lead 31 from the generally conventional pulse width modulation power bridge amplifier 29. Amplifier 29 receives an input error signal at junction 25 which is supplied as an input to the respective positive and negative comparator circuits 27 and 28. Amplifier 29 includes a triangular wave generator 26 of a generally conventional nature which supplies timing control signals to comparators 27, 28. The outputs of the latter circuits are coupled to a conventional power bridge 30 which supplies the variable polarity output to motor 36.

Circuit 29 may typically be of the kind described in the P.A. Rauschelbach U.S. Pat. No. 3,838,833 for "Aircraft Automatic Flight Control System", issued Nov. 19, 1974 and assigned to Sperry Rand Corporation, and elsewhere. The alternating power signal supplied by a power source (not shown, but which is the same source as that used by demodulator 9) to terminal 11 causes signal generator 26 to form a triangular wave train which is, in turn, applied through junction 24 to each of the respective positive and negative comparators 27, 28. The error signal at junction 25 has the effect of raising or lowering the normal reference levels of comparators 27, 28 as the error signal goes positive or negative. As a consequence, positive or negative current pulses having pulse widths proportional in magnitude to the error signal appear at the outputs of the comparators 27, 28. The resultant pulse width modulated trains are applied to a conventional transistor switched power bridge 30 which, in turn, energizes torque motor 36 via lead 31. Where the amplitude of the pulse train remains positive, motor 36 turns in a first sense; where it is negative, motor 36 turns in the opposite sense.

As previously noted, pick off 37 measures the degree of extension (or retraction) produced by the signal on lead 31 between shafts 34, 38 by motor 36, and this displacement or servo position feedback signal $V_4$ is coupled via electrical lead 10 to be converted into a direct current by demodulator 9. Circuit 9 uses as its terminal 11 the same sine wave power signal as was applied to terminal 11 of triangular signal generator 26, but now as a demodulation reference signal.

This demodulated displacement signal is coupled through lead 7, resistor 4, and the common input junction 2 to the negative poled input of operational amplifier 17 of stall current limiter 15. The displacement signal is also applied after demodulation to differentiator or rate circuit 6 and then through resistor 5 to the common input junction 2. As previously noted, the servo position command $V_3$ is coupled through resistor 3 to the same common junction 2. The output of stall current limiter 15 as derived from its output terminal 22 is additionally coupled through feedback resistor 16 to the common junction 2 and consequently also to the negatively poled input of amplifier 17. Resistors 3, 4, 5 are conventionally selected to provide the desired bandwidth for the servo loop.

In addition to the signals supplied to the negatively poled input of operational amplifier 17, its positively poled input is coupled to ground through a resistor 18 in the usual manner. In accord with the present invention, the output $V_1$ of amplifier 17 is coupled at junction 19 to a parallel connected R-C circuit composed of resistor 20 having a resistance $R_1$, and a capacitor 21 having a capacitance $C_1$. The output of the $R_1$-$C_1$ circuit, which constitutes a wash-out circuit, is as aforementioned, fed in controlling relation to the input junction 25 of the power bridge amplifier 29.

The power bridge amplifier is conventionally designed to provide a maximum output current whenever the servo error voltage $V_2$ at junction 25 exceeds the predetermined voltage level $V_{100}$ (FIG. 2). For servo error voltages $V_{29}$ less than $V_{100}$, the output of power bridge amplifier 29 is pulse width modulated at a duty cycle that is a linear function of the amplitude of voltage $V_2$. In the prior art systems, in the event of an electrical failure, an operator-induced error, or a stall of servo motor 36 because of the sustained presence of an excessive mechanical load, the difference between the servo position command voltage $V_3$ and the feedback voltage $V_4$ may actually cause the voltage at the power amplifier input to exceed voltage $V_{100}$ indefinitely, reaching saturation plateau 40 in FIG. 2. In this situation, maximum current is still undesirably applied to motor 36 even though it is stalled, thereby subjecting the motor to possible damage.

According to the invention, the damaging situation is removed by stall current limiter 15; i.e., by coupling the parallel $R_1$ - $C_1$ wash-out network between the output of amplifier 17 and the input of power bridge amplifier 29, while coupling the feed back resistor 16 around both the amplifier 17 and network 20-31. Now, by way of example, if a positive step voltage is applied and maintained as at 40 in FIG. 2 to limiter 15 of sufficient amplitude to saturate amplifier 17, the voltage $V_2$ at junction 25 follows the typical washout path 41 of FIG. 2, reducing $V_2$ to a safe low value. This may be expressed in the form of an equation for $V_2$ if the effective series load resistance of the input to comparators 27, 28 is parallel with feedback resistor 16 is defined as $R_L$:

$$V_2(S) = V_{SAT}\left(1 - \frac{R_L}{R_1 + R_L} \frac{1}{\left[\frac{R_1 R_L}{R_1 + R_L} C_1 S + 1\right]}\right)$$

where S is the Laplace operator.

It will be seen from the equation that the decay time constant is $(R_1 R_L C_1)/(R_1 + R_L)$ seconds. It is seen that a large voltage $V_2$ at junction 25 commands one hundred percent modulation duty cycle only for the short period of time of plateau 40, but then quickly decays to the level $V_F$, demanding only a small duty cycle for a long term or sustained servo loop error. In one typical helicopter installation, the time decay from the $V_{SAT}$ to the $V_{100}$ state is about 0.25 seconds and the predetermined low voltage $V_F$ provides only a 45 percent modulation duty cycle of power amplifier 29.

Accordingly, it is seen that the invention provides improvements whereby the sustained stall currents of an actuator servo loop is effectively limited without adversely affecting actuator speed or servo loop dynamics by supplying variable current limits. Full flow current capacity is allowed in dynamic situations, but a desirably severe current limitation is imposed in the event of a long term stall of the actuator. A simple and inexpensive modification of the servo control circuit permits the improvement with no limitation of the maximum slew rate and no adverse effects on the large and small amplitude frequency response.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. Craft control surface positioning means including actuator means responsive to manual and electrical control inputs for establishing the position of said control surface, and further comprising:
   pick off means for generating a first electrical measure of said position,
   combining network means for combining said first electrical measure and a second electrical measure representative of a servo position command for forming the output of said combining network means,
   stall current limiter means coupled to said combining network output,
       said stall current limiter means including: amplifier means, resistance-capacitance network means in series with said amplifier means, and
       feedback resistor means coupled from said resistance-capacitance network means output to said output of said combining network means, and power amplifier means responsive to said stall current limiter means for providing said electrical input to said actuator means.

2. Apparatus as described in claim 1 further including: circuit means responsive to said first electrical measure
for generating a rate signal, and demodulator means responsive to said pick off means for supplying direct current versions of said first electrical measure and of said rate signal to said combining network means.

3. Apparatus as described in claim 1 wherein said resistance-capacitance netwok means, said feedback resistor means, and said combining network means are so arranged that both high and low frequency components of said second electrical measure are effective to operate said craft control surface.

4. Apparatus as described in claim 3 wherein said power amplifier means comprises pulse width pulse modulation power bridge amplifier means.

5. A servomechanism apparatus for controlling the control surface of an aircraft including an electric servomotor connected to position said control surface and power amplifier means for supplying control currents to said servomotor, said apparatus further comprising:

means for supplying a servomotor control signal proportional to the difference between a servomotor position command signal and the existing position of said control surface, and stall current limiter means responsive to said servomotor control signal and connected to said power amplifier means for controlling the current supplied to said servomotor, said stall current limiter means comprising washout circuit means for reducing said servomotor current to a predetermined low value for sustained values of said servomotor command signal.

6. The apparatus as set forth in claim 5 wherein said stall current limiter means further comprises a parallel connected resistance-capacitance network.

7. The apparatus as set forth in claim 6 wherein said stall current limiter means further comprises amplifier means having its input responsive to said control signal and its output connected to the input of said resistance-capacitance network, and feed back means responsive to the output of said resistance-capacitance network and connected to the input of said amplifier means for establishing said washout circuit time constant and said predetermined low current value.

* * * * *